C. W. CAMPBELL.
BRIDLE.
APPLICATION FILED MAR. 16, 1914.
1,125,465.
Patented Jan. 19, 1915.
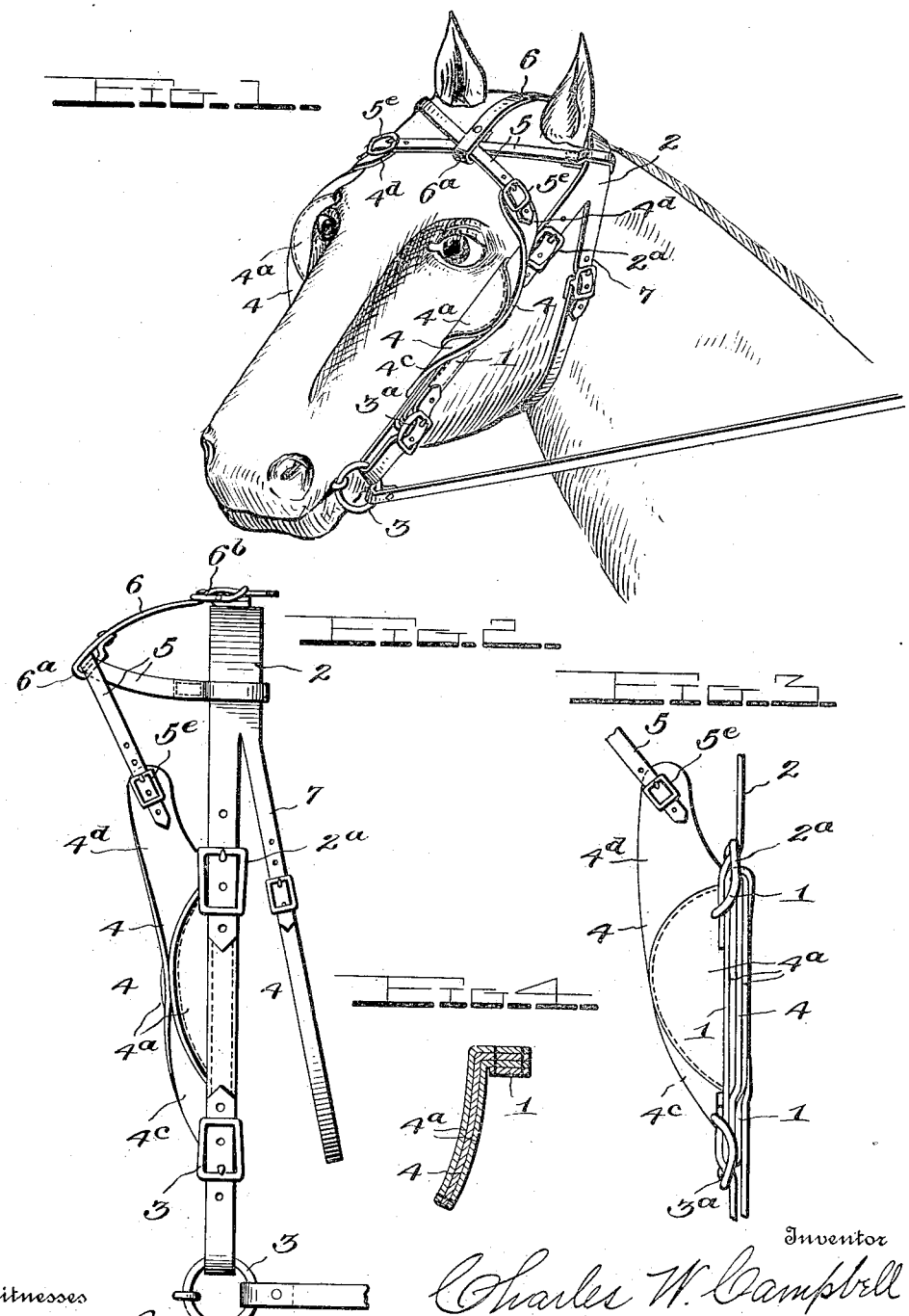

UNITED STATES PATENT OFFICE.

CHARLES W. CAMPBELL, OF MACON, GEORGIA.

BRIDLE.

1,125,465.  Specification of Letters Patent.  Patented Jan. 19, 1915.

Application filed March 16, 1914. Serial No. 825,132.

*To all whom it may concern:*

Be it known that I, CHARLES W. CAMPBELL, a citizen of the United States, residing at Macon, in the county of Bibb and State of Georgia, have invented certain new and useful Improvements in Bridles; and I hereby declare that the following is a full, clear, and exact description thereof, reference being had to the accompanying drawings, which form part of this specification.

This invention is a novel improvement in bridles, and its object is to provide a blinder bridle with novel winkers, and winker adjusting devices, which will also serve as the brow band of the bridle. The winkers can be adjusted to suit the animal on which the bridle is used, so that they will not cover its eyes too closely, nor chafe nor heat the eyes or head of the animal; and which will prevent the animal from looking over the blinds by raising its head.

The accompanying drawings illustrate a bridle embodying the invention, and I will explain the same with reference thereto.

In said drawings: Figure 1 is a perspective view of the bridle applied to a horse. Fig. 2 is a side view of the bridle detached. Fig. 3 is an edge view of Fig. 2 showing one side portion of the bridle. Fig. 4 is an enlarged detail section through a blinder.

The bridle, as shown, has side members 1 which may be connected to the head-stall strap 2 by means of buckles $2^a$, and to a bit 3 by means of buckles $3^a$, in the usual manner; to enable the bridle to be adjusted to the animal's head.

To the side members 1, are attached blinders, which are preferably formed of an inner member 4 and outer members $4^a$; the members $4^a$ are preferably rounded or semi-circular in contour, and are stitched together and to the interposed member 4, as indicated in the drawings, so as to form practically a rigid blind. The base portions of these members $4^a$ and 4 may be stitched, or otherwise secured to the side members 1, as indicated in the drawings. The member 4 of the blinder preferably extends both below and above the members $4^a$, and the lower portion $4^c$ of member 4 is stitched to the adjacent side member 1, or otherwise secured thereto, and forms an extension of the blinders below the members $4^a$. The upper portion $4^d$ of member 4 projects above the members $4^a$ and is not attached to the side member, and forms a flexible winker; which will extend above and partially over the adjacent eye of the animal when the bridle is in position, without covering the eye too closely; and will not heat nor chafe the animal. Such winker prevents the animal seeing over the blind or winker when its head is raised.

The blinders formed of leather parts 4 and $4^a$ are sufficiently rigid to maintain their shape, and when properly formed and set the blinders stand out at approximately right angles to the side members while the flexible winkers can turn inward above the eyes of the animal almost at right angles to the blinders proper.

Each winker $4^d$ is adjustably connected by a strap 5 to the head-stall strap 2; the winker straps 5 are crossed so that the winker at the left hand side of the bridle is connected with the right hand side of the head stall; and the winker at the right hand side of the bridle is connected to the left hand side of the head-stall. The straps 5 may be loosely engaged, at their point of intersection, with a loop $6^a$ on a strap 6 adjustably attached to the center of the head-stall by a buckle $6^b$ in the usual manner. The head-stall may be provided with the usual neck strap 7.

The connections between the winkers and the stall should be adjustable; and for this purpose the straps 5 may be provided with take-up devices of any suitable kind; as shown straps 5 are adjustably engaged with buckles $5^e$ attached to the extremities of the winkers $4^d$. The winker straps 5 serve not only for holding the winkers in position and adjusting them to suit the head of the animal upon which the bridle is used; but they also take the place of the ordinary brow band, and constitute a brow band adjustable to fit the head of the animal; and the same adjusting devices adjust both the winkers and the brow band, so that when the winkers are adjusted to proper position over the eyes of the animal the brow bands are also adjusted to fit the head of the animal, keep the winkers in proper place, and the headstall in position.

The features of adjustability of the winkers; of combined winker and head stall straps; and of flexible winkers attached to the blinders, are the important novel and useful features of the invention.

What I claim is:

1. In a bridle, the side members and head stall, with blinders attached to the side members, adjustable winkers at the upper ends of said blinders, and separate straps connecting each winker with the head stall and forming a brow band for the bridle.

2. In a bridle, side straps, a head stall, blinders attached to the side members and standing at approximately right angles thereto, flexible winkers attached to the upper ends of said blinders, and separate straps adjustably connecting each winker with the head stall and forming a brow band for the bridle.

3. A bridle comprising side members, a head stall, blinders attached to the side members and having leather portions extending below the blinders proper and attached to the side pieces and also extending above the blinder forming flexible winkers, and adjustable connections between each winker and the head stall.

4. In a bridle the combination of side members, a head stall, blinders attached to the side members and separate straps adjustably connecting each blinder with the head stall, said straps crossing each other to form a brow band.

5. In a bridle the combination of side members a head stall, blinders attached to the side members and having central leather portions extending above and below the blinders proper and forming flexible winkers above the blinder, and separate straps adjustably connecting each winker with the head stall, said straps forming a brow band.

6. A bridle comprising side members, a head stall, stiff blinders attached to the side members, and flexible portions attached to and extending above the blinders and forming flexible winkers, and adjustable straps independently connecting each winker with the head stall and forming a brow band.

7. A bridle comprising side members, a head stall, blinders attached to the side members and each having a leather portion extending above the blinders and forming a flexible winker portion, and separate straps adjustably connecting each winker with the head stall below the animal's ears and together forming the brow band of the bridle.

In testimony that I claim the foregoing as my own, I affix my signature in presence of two witnesses.

CHARLES W. CAMPBELL.

Witnesses:
JULIUS H. OTTO,
L. J. BERNE.

Copies of this patent may be obtained for five cents each, by addressing the "Commissioner of Patents, Washington, D. C."